Sept. 13, 1960 G. BRERETON 2,952,044
HARVESTING AND DECORTICATING MACHINES
Filed June 22, 1954. 3 Sheets-Sheet 1
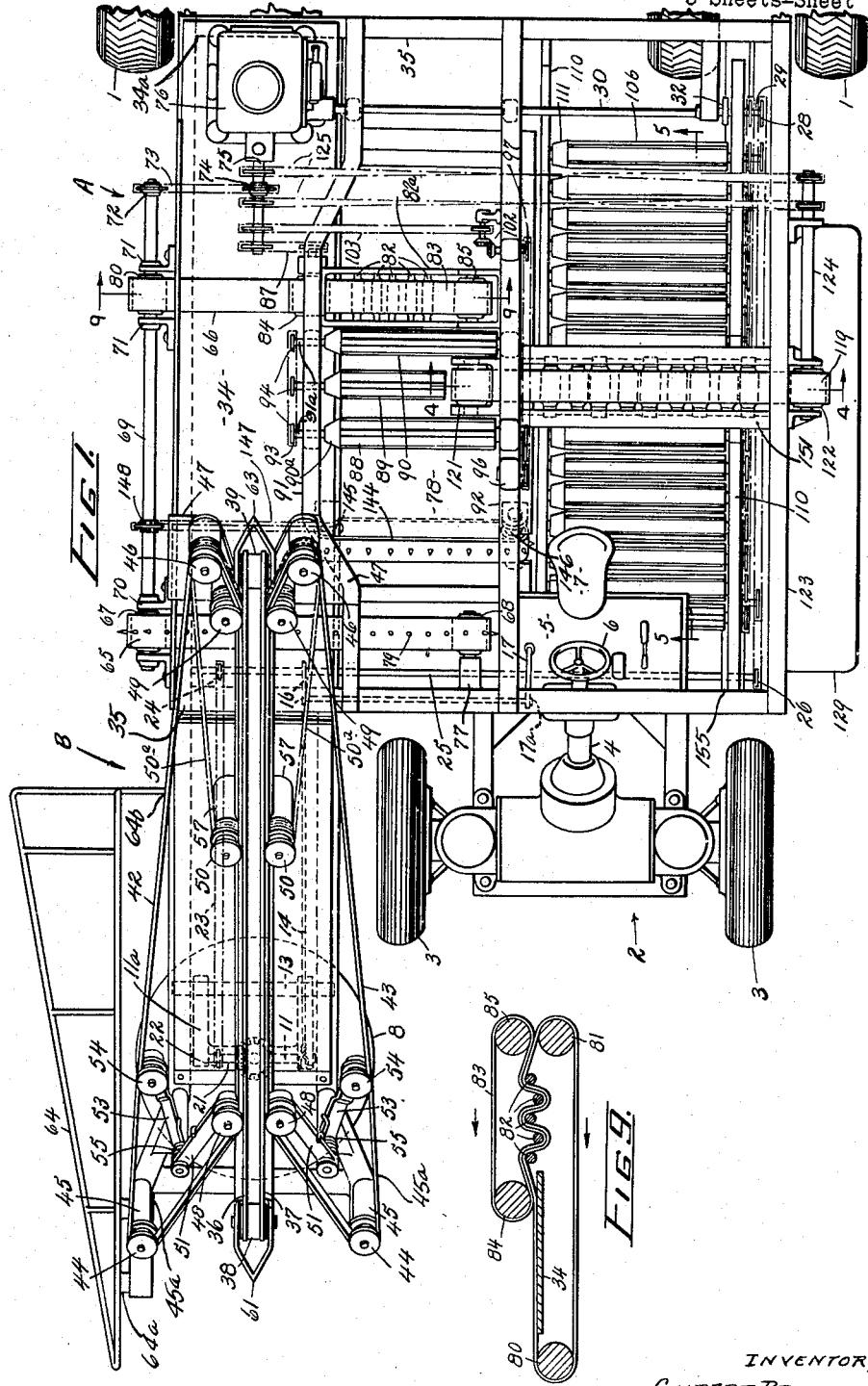
INVENTOR,
GILBERT BRERETON
BY Sept. 13, 1960 G. BRERETON 2,952,044
HARVESTING AND DECORTICATING MACHINES
Filed June 22, 1954 3 Sheets-Sheet 2
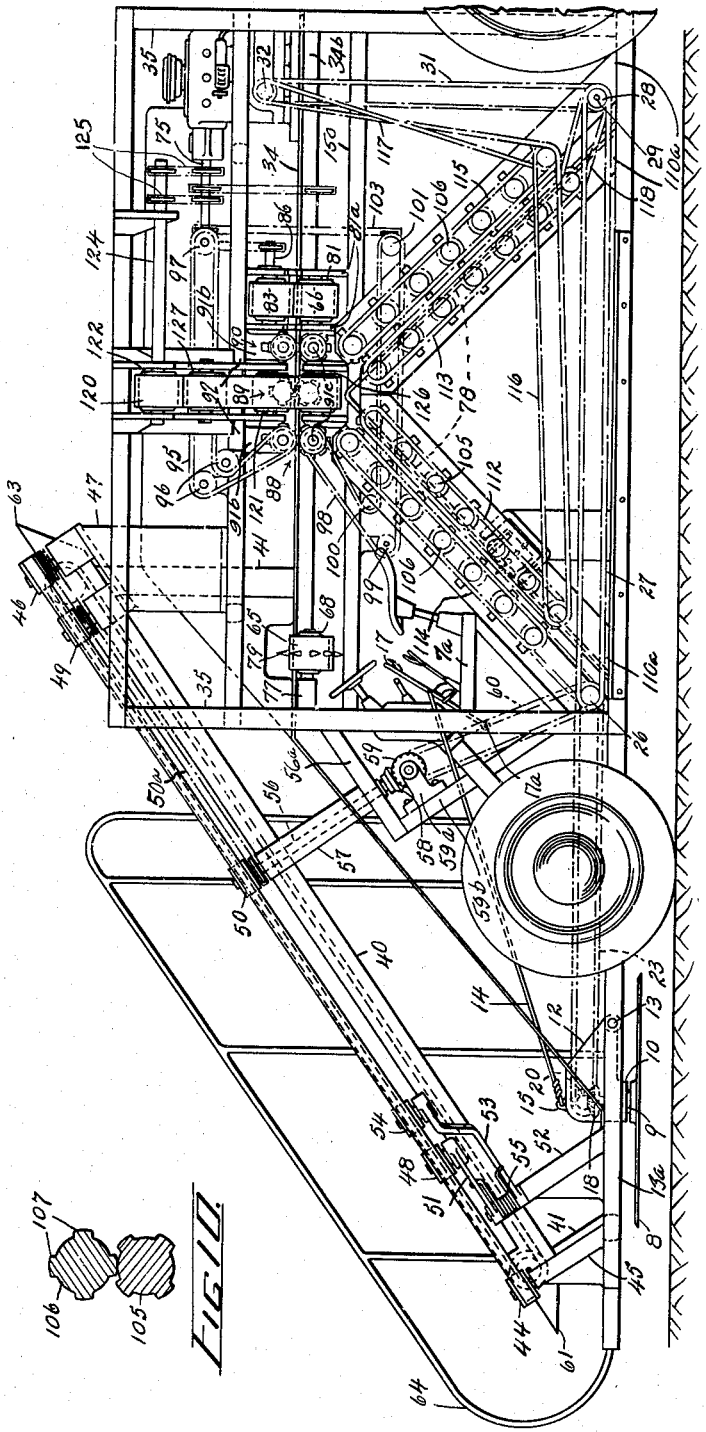
INVENTOR,
GILBERT BRERETON Sept. 13, 1960  G. BRERETON  2,952,044
HARVESTING AND DECORTICATING MACHINES
Filed June 22, 1954  3 Sheets-Sheet 3
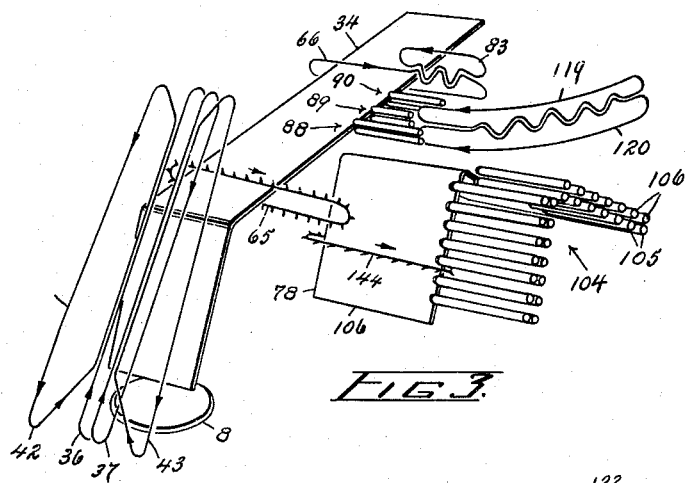
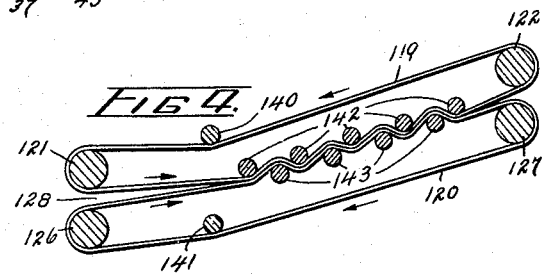
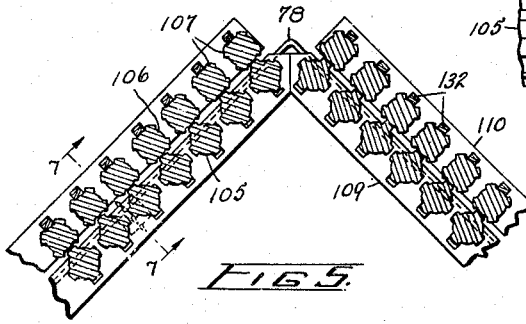
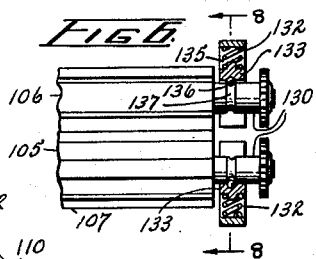
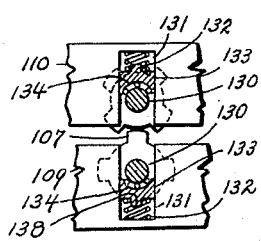
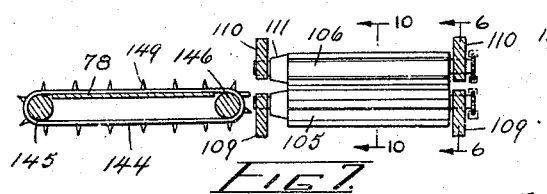
INVENTOR,
GILBERT BRERETON United States Patent Office 2,952,044
Patented Sept. 13, 1960

2,952,044

HARVESTING AND DECORTICATING MACHINES

Gilbert Brereton, 1300 St. Andrew St., New Orleans, La.

Filed June 22, 1954, Ser. No. 438,573

6 Claims. (Cl. 19—12)

The invention relates to improvements in machines for harvesting and decorticating vegetable stalks such as flax, hemp, kenaf, rami and the like.

The general object of the invention is to provide a simple and compact machine by means of which, as it moves through the standing crop, the stalks are cut and subjected to thorough decortication whereby the useful fibres will be effectually liberated from the stalks and delivered in loose, untwisted strands, soft in texture and completely free of bark and other undesirable matter.

An important feature of the present invention is an improved means for conveying the cut stalks upwardly in erect condition and depositing same lengthwise of the machine on a table in horizontal position and then delivering them laterally to the decorticating mechanism in an untangled condition.

Another important feature of the invention is an improved arrangement of the main scraping rollers which provides for superior decortication within a very limited space, thus making possible the carrying out of the various steps in a machine sufficiently small to be easily maneuverable. According to this improved arrangement a considerable number of pairs of scraping rollers are arranged in each of two medially spaced lines providing a formation of substantially inverted-V-shape when viewed towards the inner side of the machine, with the rollers extending crosswise of the machine and at right angles to the longitudinal axes of the stalks on the table, so that there is provided an inverted-V-shaped passage for the stalks through the rollers.

Another feature of the invention resides in means for rendering limp and pliable the stalks at their centres during their progress to the aforesaid sets of scraping rollers so that they will readily assume inverted-V-shapes correctly positioned for entry laterally into the correspondingly shaped passage formed by the aforesaid arrangement of the various pairs of rollers.

A still further important feature of the invention resides in the novel means for moving the portions of said stalks endwise of said pliant medial parts laterally through said sets of scraping rollers while positioned at right angles to the longitudinal axes of said rollers and for providing alternately increasing and decreasing degrees of inward endwise pull on said portions against outward endwise pull on the outer ends of the stalks, caused by the rotation in opposite directions of the rollers at opposite sides of said medial pliant portions, so as to provide for lengthwise reciprocation of the stalks in passage along the rollers and thus insure complete decortication of the stalks throughout their entire lengths.

The invention consists essentially in the novel features of construction, arrangements and combinations of parts set out in the present specification and more particularly pointed out in the claims for novelty following.

In describing the invention reference will be made to the accompanying drawings, in which:

Figure 1 is a plan view of a harvesting and decorticating machine embodying my invention.

Figure 2 is a side elevation of the device shown in Figure 1.

Figure 3 is a diagramatic view showing the general arrangement of the several parts employed to operate on the stalks.

Figure 4 is a cross section on an enlarged scale taken on the line 4—4 of Figure 1.

Figure 5 is a longitudinal section taken on the line 5—5 of Figure 1.

Figure 6 is in an enlarged section taken on the line 6—6 of Figure 7.

Figure 7 is a cross section taken on the line 7—7 of Figure 5.

Figure 8 is a cross section taken on the line 8—8 of Figure 6.

Figure 9 is a cross section taken on the line 9—9 of Figure 1.

Figure 10 is an enlarged cross section taken on the line 10—10 of Figure 7.

Like numerals of reference indicate corresponding parts in the various figures.

Referring now to the drawings in which the present preferred embodiment of the invention is shown.

The frame structure of my machine comprises two main parts, namely, a body A which is adapted to carry the decorticating mechanism, and a frame part B of considerably less than half the width of said body and projecting forwardly from said body in edgewise alignment with the side of the body which is positioned next to the standing crop in the movement of the machine through the crop, the said forwardly projecting frame part being adapted to carry the cutting device and the conveyors by means of which the cut stalks are transported to the decorticating mechanism.

The body A is rendered tractable by means of suitable running gear which, at the rear, takes the form of a suitable transverse axle (not shown) carrying wheels (not shown) and tires, indicated at 1, positioned at opposite sides of the body. From the front end of the body there projects forwardly a relatively narrow frame part 2 positioned between the frame part B and what may be termed the outer side of the machine as it is the side farthest removed from the standing crop in the reaping process. The frame part 2 provides the support for suitable running gear including front wheels, indicated at 3, together with appropriate steering apparatus (not shown in detail) including a post 4 leading to the driver's compartment, indicated at 5, and having the usual steering wheel 6 accessible to the operator when seated on the seat 7, which latter is carried on a platform 7a which in turn is supported in the frame structure, the particular connecting means between the platform and frame structure not being shown.

The particular means by which the machine is propelled does not constitute a feature of the invention and it is to be understood that the machine may be moved by the employment of a tractor or, it may be equipped with suitable power means whereby it is self-propelled.

8 denotes a rotary cutter by means of which the stalks are cut as the machine is moved against a marginal part of the standing crop.

The cutter 8 is positioned near the forward end of the frame part B and is mounted on a vertical shaft 9 which is mounted in a bearing 10, which in turn is supported in the cross arm 11 of a bracket 11a which includes rearwardly extending end members 12. These end members or arms are pivotally mounted on a transverse shaft 13 supported in the frame structure 13a. It will thus be seen that the cutter supporting bracket can be tilted upwardly to permit of the adjustment of the cutter vertically to meet varying conditions of terrain. In order that the cutter may be tilted from within the driver's compartment a cord or cable 14 is provided, this cord being attached at one end to a suitable ear 15 on the front end of the cutter support and extending rearwardly around suitably directing pulleys, indicated at 16, and secured at its other end to a suitable hand lever 17 positioned within reach of the operator. The hand lever 17 is pivoted at its lower end in the frame structure, as indicated at 17a.

The vertical cutter shaft 9 carries a horizontal bevel gear 18 which meshes with a driving gear 20. The gear 20 is carried on a horizontal shaft 21 journaled in the frame and carrying a fixed pulley 22. A belt 23 operates over the pulley 22 and over a pulley 24 carried on a cross shaft 25. The cross shaft extends completely across the body A and is supported at one end in the frame member 35 and near its other end in a member 155 and carries at its end located at the outer side of the body a pulley 26 fixed thereto. For imparting rotation to the pulley 26 there is provided an endless belt 27 which extends lengthwise of the outer side of the body and around a pulley 28 fixed to a cross shaft 29. This cross shaft 29 is connected with the transversely arranged motor shaft 30 by means of a vertically operating belt 31 operating over a pulley 32 and a pulley (not shown) below the pulley 32 on the shaft 29.

34 is a table which extends lengthwise of the body A along the inner side of said body, said table being substantially equal in width to the frame part B and positioned in alignment with the cutter 8 and being on a very much higher plane than said cutter. The table may be secured in any suitable way, such as by securing it to the ends 35 of the frame by welding, as at 34a and by the use of any suitable type of bracing, such as cross members 34b positioned beneath the table and welded or otherwise secured at their ends to the frame 35.

The means for bunching the tops of the stalks standing within the swath of the cutter, guiding same to the inclined conveyors and conveying same upwardly subsequent to being cut and depositing them on the table 34 lengthwise of the machine consists of a number of cooperating belts, arranged to provide two inclined conveyors operating parallel from a point forwardly of the cutter 8 to a point above the table 34 at a height to contact the stalks substantially medially of their ends.

Of such belts two, denoted by the numerals 36 and 37, which may be termed the inner belts, operate in parallel over grooved idle pulleys 38 and 39, positioned within a trough-like frame 40 extending from a point forwardly of the cutter to a point behind the front end of the table 34 and supported by an upright 41, the pulley 38 being positioned in the front end of the frame 40 and the pulley 39 being positioned above the forward end of the said table 34. The belts 36 and 37 are so arranged as to cross the centre of the cutter 8.

42 and 43 are the belts which cooperate with the belts 36 and 37, respectively, to complete the two parallel conveyors for elevating the stalks in erect condition to bring the bottom ends of the cut stalks to positions over the front end of the table 34.

The belts 42 and 43 are positioned at the outer sides of the belts 36 and 37, respectively, and operate at the front end of the machine over fixed pulleys 44 carried by posts 45, which latter are located considerably in advance of the cutter 8 and in substantial alignment lengthwise of the machine with the outer edge of the cutter and are secured to the frame as at 45a. The extents of the runs of the belts 42 and 43 lengthwise of the machine are to points over the table 34 where they extend around the outer sides of pulleys 46 carried by a frame part 47, in proximity to the belts 36 and 37, respectively. The stalk conveying runs of the belts 42 and 43 are held in close parallel relation to the upward runs of the belts 36 and 37 from points slightly to the rear of the most advanced cutting part of the cutter 8 to points just short of the pulleys 46 by pulleys 48 and 49 and central driving pulleys 50. The pulleys 48 are carried on the ends of arms 51 which at their other ends are mounted for rotary movement on posts 52 fixed to the frame. The posts also carry arms 53 which at their outer ends carry pulleys 54 which engage the outer runs of the belts 42 and 43, respectively. The pulleys 54 at opposite sides are held spaced and in spreading engagement with the outer runs of the belts 42 and 43, respectively, by means of springs 55 which encircle the posts 52 and have their ends arranged to exert outward pressure against the arms 51 and 53.

The pulleys 49 are positioned close to their associated belts 36 and 37 and serve to limit the lateral extents of the outlets from the conveyors so that the stalks will not become bunched as they fall forwardly onto the table 34 when released from the conveyors.

The driving pulleys 50 are mounted medially of the pulleys 48 and 49 on shafts 56 which extend through fixed bearing brackets 56a. The shafts 56 carry at their lower ends horizontal bevel gears 58 which mesh with driving gears 59 supported in brackets 59a carried by frame parts 59b. The gears 59 are rotated by means of a belt 60 having driving connection therewith and extending downwardly and being driven by the shaft 25, which latter is driven as described hereinbefore. Belts 50a operating over the pulleys 50 and the pulleys 46 and 49 at the respective sides of the inner pulleys serve to drive the said pulleys 46 and 49, one pulley 50 being common to the belts 43 and 50a at one side of the trough 40 and the other pulley 50 being common to the belts 42 and 50a at the other side of the trough.

Reference to Figure 1 will show that the portions of the belts 42 and 43 running between the pulleys 44 and the pulleys 48 converge inwardly to said pulleys 48 and provide means for deflecting inwardly towards the mouths of the conveyor stalks within the limits of the said pulleys 44 and that the forward portion of the frame 40 projecting forwardly beyond the pulley 38 and lying midway between such converging parts, provide means for dividing the stalks so that substantially even numbers of stalks will be guided into each conveyor.

If desired a forwardly pointed share 61 may be provided by shaping the front end of the frame 40 appropriately to facilitate the division of the stalks and, further, a similar share 63 may be provided at the inner ends of the conveyors.

A share 64 secured as at 64a and 64b along the inner side of the frame B and extending forwardly of the pulley 44 will tilt outwardly from the machine the stalks not currently being reaped.

As stated previously herein the table 34 extends lengthwise of the body A beneath the upper portions of the conveyors, therefore, as the stalks are released from the conveyors they will drop onto the table in parallel relation to one another lengthwise of the machine.

In order that the stalks on the table may be moved laterally therefrom into the decorticating mechanism there are provided two endless conveyors 65 and 66 which extend across the table and a considerable distance therebeyond towards the outer side of the machine. These conveyors are so spaced in relation to one another they will lie beneath the stalks at points not far removed from the ends of the stalks and so will move the stalks sidewise across and off the table.

The front conveyor 65 operates over pulleys 67 and 68, the pulley 67 being mounted on a driving shaft 69 which extends lengthwise of the body A through suitable bearings, indicated at 70 and 71, and at its end nearest the rear end of the body carries a pulley 72 which has connection through a belt 73 with a pulley 74 carried by the shaft 75 of the motor 76. The pulley 68 is carried by a bracket 77 mounted on the body frame a considerable distance beyond the table 34, so that the stalks will be carried substantially across a second table, or stand, 78 of substantially inverted-V shape positioned at the outer side of the table 34 and suitably supported at its lower end on the body frame. The conveyor 65 preferably comprises a belt and is provided along its surface with outstanding pins 79 adapted to engage the stalks and facilitate the movement thereof.

The conveyor 66 extends parallel with the conveyor 65 and operates over end pulleys 80 and 81, the pulley 80 being fixed to the driven shaft 69 and the pulley 81 being suitably mounted for rotation in suitable brackets 81a carried by frame parts.

The top run of the conveyor 66 is on a true horizontal plane throughout the width of the table 34 but for the longitudinal extent of its run beyond the table 34 it is extended alternately over and under a series of idle rolls 82 set in a frame 82a in spaced relation to one another in two rows in slightly different vertical planes so that the top run of the conveyor 66 will describe an up and down path throughout that portion of its longitudinal extent beyond the table 34 and over the underlying portion of the stand 78.

Cooperating with the portion of the conveyor 66 lying beyond the table 34 subject to up and down movement is a relatively short endless belt 83 which lies above the said portion of the belt 66 and operates over end pulleys 84 and 85, the pulley 84 being driven and being carried on a shaft 86 which, through the medium of a belt 87 and suitable pulleys has connection with the motor shaft 75. The lower run of the belt 83 has its path controlled also by the idlers 82 over and under which the said lower run of the belt 83 passes, the idlers of the two rows of idlers being staggered in relation to one another so that those of the lower row will lie above and in engagement with the lower run of the belt 83 and those of the top row will lie below and in engagement with the upper run of the belt 66 and the adjacent runs of the two belts will lie parallel with one another and will receive the corresponding ends of the stalks therebetween and move them away from the table 34 and at the same time provide alternately increasing and decreasing degrees of lengthwise pull on said stalks.

Positioned between the conveyors 65 and 66 and preferably slightly nearer the conveyor 66 are three sets of scraping rollers 88, 89 and 90, respectively, each set comprising two longitudinally ribbed rollers placed one over the other and extending at right angles to the table 34 above the stand 78. These sets of scraping rollers are arranged in parallel horizontally of the machine and are so positioned with respect to the table that stalks passed laterally off the table will be carried by the conveyors 65 and 66 between the upper and lower rollers of the respective sets of rollers.

In order to facilitate the entry of the stalks laterally between the ends of the several pairs of rollers 88, 89 and 90 the said rollers are tapered at their receiving ends, as at 90a, and the exterior surfaces of such tapered portions are smooth.

The upper rollers of the pairs 88 and 90 have their shafts 91a journaled at their ends in a vertical bracket 91b welded or otherwise secured to lengthwise extending frame members 91 and 92 and extending downwardly therefrom and the lower rollers of said pairs 88 and 90 have their shafts 91c journaled in the frame members 34b. The rollers of the central pair of rollers 89 are supported at their forward ends in the vertical bracket 91b from the frame member 91 and the frame member 34b, respectively, and, due to their relative shortness of length are not, supported at their outer ends. The upper rollers of the various pairs of rollers 88, 89 and 90 are operatively connected together at their forward ends by a belt 93 operating over suitable pulleys 94 carried by the shafts of said rollers. The lower rollers of the pairs of rollers 88, 89 and 90 are also connected by a belt 93 but this latter belt is not seen as it lies beneath the upper belt 93.

The top roller of the pair of rollers 88 is driven by an endless belt 95 which extends upwardly over guide pulleys 96 and over a pulley 97 through the medium of cooperating gears, indicated at 102, a belt 103 and suitable intermediate pulleys, all driven by the motor shaft 75.

The lower roller of the pair 88 is driven in cooperation with the top roller of said pair by a belt 98 whereby there will be a pull on the stalks in a direction towards the front of the machine and against the alternately increasing and decreasing degrees of pull on the stalks in the opposite direction caused by the undulating movement imparted to the ends of the stalks while they are between the cooperating portions of the belts 66 and 83.

It will be seen from the foregoing description that as the stalks are passed laterally through the pairs of rollers 88, 89 and 90, through the medium of the conveyors 65 and 66 and the belt 83 they will be subject to alternately increasing and decreasing degrees of pull lengthwise in a direction at right angles to the longitudinal axes of the various scraping rollers so that the medial portions of said stalks for distances corresponding to the distance between the outer limits of the combined pairs of scraping rollers lengthwise of the machine will be thoroughly scraped and so rendered pliant medially so that when such medial portions are held suspended the unscraped end portions lying beyond said medial portions will drop downwardly onto the sloping sides of the stand 78 when released from the scraping rollers at the outer ends of the latter.

The belt 98 driving the lower roller of the pair 88 extends downwardly and forwardly of the machine around the forward sides of pulleys 99 and 100 and thence rearwardly and over a pulley 101 which is driven by the motor shaft 75 through the medium of cooperating bevel gears not shown lying beneath and identical with the gears 102 and driven by the common belt 103 and a suitable intermediate pulley.

Positioned at the outer side of the stand 78 and having their longitudinal axes extending transversely of the machine are a plurality of pairs of scraping rollers, indicated generally by the numeral 104 (Figure 3), arranged in two inclined series presenting together in end elevation a substantially inverted-V-shaped formation corresponding in incline to the inclined sides of the stands 78.

Each such series of scraping rollers comprises a like number of pairs of rollers and each pair of rollers consists of an inner roller 105 and an outer roller 106 with the rollers of each series forming two parallel inclined lines between which the stalks at the ends of the medial pliant portions are adapted to be passed.

Each roller is provided with a like number of longitudinally arranged ribs 107 evenly spaced circumferentially thereof and adapted for substantial meshing engagement with the ribs of the roller associated therewith (Figures 5 and 10) and each roller has endwise projecting shafts 130.

The inner and outer rollers of the respective pairs of rollers have their shafts journaled for rotation in inner and outer frame members 109 and 110, respectively, of substantially inverted-V-shape positioned at opposite ends of the rollers and suitably supported at their lower ends as at 110a by the body frame. The inner and outer frame members 109 and 110 are spaced from one another in alignment with the inclined sides of the stand 78 and the inner and outer rollers 105 and 106 of the several pairs of rollers are tapered, as at 111, to their shaft parts at the receiving ends which lie close to the outer edge of the stand 78, so as to provide tapered entrances for the stalks passing laterally to positions between the ribs of the said rollers for scraping.

The rollers 105 and 106 of each pair of scraping rollers are so journaled at their outer, or delivery, ends as to be spring influenced towards one another but being yieldable outwardly under pressure of material therebetween. The shafts 130 of these rollers lie in opposed rectangular cuts 131 in the opposing edges of the frame members 109 and 110 and are spring influenced towards one another by means of spiral springs 132 confined between the bases of the cuts and the roller shafts and pressing against bearing blocks 133 which at their inner sides have semi-circular recesses 134 in which are provided ball races 135. Balls 136 positioned in the races 135 and in annular grooves 137 in the shafts 130 provide yieldable supports for said shafts in view of the springs therebehind. The blocks 133 preferably have lateral projections 138 for centering the springs in relation thereto.

The scraping rollers of the two series of rollers are driven in opposite directions so that the ends of the stalks will be pulled outwardly as the portions at opposite ends of the medial pliant portions thereof are passed sideways through the several pairs of scraping rollers of each series.

While any suitable means may be employed for driving the pairs of rollers of the respective series in opposite directions the means shown herein for illustrative purposes comprises belts 112 and 113 connecting the inner rollers of the respective series, belts 114 and 115 connecting the outer rollers of the respective series to provide coincident movement thereof, a belt 116 running lengthwise of the machine and operatively connecting the lowermost inner roller of one series with the lowermost outer roller of the other series whereby the inner and outer rollers of the two series will be rotated, a crossed belt 117 having suitable connection with the motor shaft 30, and a short belt 118 operating over the lowermost inner roller of the series of rollers nearest the rear of the machine and over a pulley (not shown) mounted on the cross shaft 29.

The means for grasping the medial parts of the stalks rendered pliant during their passage through the pairs of scraping rollers 88, 89 and 90 and, by means of a pull on said medial parts drawing the end parts of the stalks laterally across the stand 78 and into the inclined passages between the rollers 105 and 106 of the various pairs of rollers, and along said rollers while the stalks are being scraped by said rotating rollers, and also for imparting lengthwise reciprocatory motion to the stalks while being scraped by the rollers consists of upper and lower conveyor belts 119 and 120, respectively, extending transversely of the body A from the outer end of the pair of scraping rollers 89 to a point beyond the delivery end of the scraping rollers 105 and 106 and receiving the pliant medial portions of the stalks between the inner runs thereof and through movement in a direction towards the final scraping rollers 105 and 106 drawing the stalks to the delivery side of the body.

The conveyor belt 119 operates over pulleys 121 and 122 journaled in a frame 151, the pulley 121 being positioned, and suitably supported, between the pairs of scraping rollers 88 and 90 at the end of the pair 89 of the scraping rollers, and the pulley 122 being positioned exteriorly of the frame part 123 beyond the inverted-V formation of scraping rollers and fixed to a shaft 124 which through common cross belts 125 has connection with the motor shaft 75.

The conveyor belt 120 operates over pulleys 126 and 127 journaled in the frame 151, the pulley 126 being positioned beneath the pulley 121 and spaced somewhat therefrom to provide an entrance 128 for the medial portions of the stalks therebetween, and the pulley 127 being positioned beneath and slightly forward of the pulley 122 and spaced slightly therefrom to provide a delivery mouth through which the said pliant medial portions of the stalks are expelled, at a point above the platform 129 which is provided for the accommodation of the operator stationed there to receive the scraped stalks.

The outer runs of the belts 119 and 120 for those portions of their length which run above the stand 78 are held to a lesser degree of incline than the remainder by the provision of idle rolls 140 and 141, positioned above said runs at points substantially over the outer edge of said stand 78 and journaled in the frame 151.

The inner runs of the belts 119 and 120 which cooperate to grasp the medial pliant portions of the stalks and draw them transversely across the inverted V-shaped scraping roller formation 104 are held in close relation to each other and are forced to an undulating path while over said scraping roller formation, by means of an inclined series of spaced idle rolls 142 extending transversely of and under the belt 119 and supporting the said run against lateral movement, and a series of idle rolls 143 positioned beneath the inner run of the belt 120, on a slightly lower plane than the rollers 142 but overlapping said rolls 142 in a direction laterally of the belts and alternating with said rolls 142 so that the path of the inner runs of said belts will be an up and down one, whereby the portions of the stalks at the ends of the pliant portions progressing along such undulating path will be subjected to increasing and decreasing degrees of pull alternately. The result of this variation in pull on the ends of the stalks is that such end portions will be reciprocated lengthwise in a direction at right angles to the longitudinal axes of the scraping rollers against the continuous outward influence of said scraping rollers, and will at the same time be drawn laterally in respect to the longitudinal axes of the rotating scraping rollers. The final result of this cycle of operations is that the stalks will be thoroughly scraped throughout their lengths. The rollers 142 and 143 are journaled in the frame 151.

In order to facilitate the movement of the heavier lower ends of the stalks, which lie on the front inclined part of the stand 78 there is provided an endless conveyor 144 which extends across said stand on a lower plane than the conveyor 65 to a point just inside the inverted-V-shaped scraping roller formation. This conveyor operates over pulleys 145 and 146 and is driven by an endless belt 147 which has connection with the pulley 145 and with a pulley 148 which is fixed to the shaft 69.

The operation of this invention is as follows:

The height at which the cutter is to engage the stalks is determined by the condition of the terrain and the cutter is adjusted accordingly by simply manipulating the handle 17 located within the reach of the operator seated on the seat 7. The machine is moved, by such means as may be provided for the purpose, against a standing crop to a depth corresponding substantially to the width of the cutter 8 and as it moves the point of the share 64 divides the standing stalks so that one part of the divided crop will be deflected inwards of the adjacent pulley 44 and will be severed by the cutter while the stalks beyond the share will be bent in a direction away from the machine. The stalks immediately in advance of the cutter will be divided by the share 61 so that substantially even numbers of the cut stalks will be guided inwardly to each of the conveyors provided by the belt 36 and the belt 42 at one side and the belts 37 and 43 at the other side.

The conveyors are positioned at the correct height to grip the stalks substantially midway of their lengths and will carry the stalks upwardly in upright condition to the point where their lower ends will be above the front end of the table 34 and in advance of the transverse conveyor 65. As the stalks are released they will fall in parallel relation to each other lengthwise of the table 34 where they will lie across the conveyors 65 and 66. These conveyors 65 and 66 move the stalks laterally of the table and carry them between the tapered ends 90a of the respective connected pairs of longitudinally ribbed scraping rollers 88, 89 and 90, which extend at right angles to the longitudinal axes of the stalks and are rotated through the medium of the motor shaft 75 and intermediate connections described hereinbefore, in a direction to cause a pull on the stalks towards the front end of the machine. Just previous to the entry of the stalks between the rollers of the several pairs of rollers 88, 89 and 90 the inner ends of the stalks have been carried into the jaws provided by the cooperating belts 66 and 83 and are carried by said cooperating belts and the conveyor 65 transversely of the machine along the said scraping rollers, during which time said belts 66 and 83 not only offer resistance to the pull on the stalks by the rotating scraping rollers in a direction forwardly of the machine but cause, through the up-and-down path they force the inner ends of the stalks to travel, alternately increasing and decreasing degrees of pull on the stalks in a direction rearwardly of the machine. This rearward pull on the stalks as they move to the high points over the topmost idle rollers 82 causes said stalks to be moved lengthwise while the stalks are being acted on by the rotating scraping rollers. As the portions of the stalks between the belts 66 and 83 move to their lowermost positions beneath the lowermost rollers 82 the rearward pull on the stalks is released allowing the stalks to be pulled towards the front of the machine by the rotary movement of the scraping rollers. Through the opposite action of the scraping rollers causing pull on the one ends of the stalks in one direction and the intermittent pull on the stalks in the opposite direction by the undulating conveyor belts 66 and 83 a lengthwise reciprocatory movement is imparted to the stalks during their progress lengthwise of the ribbed scraping rollers so that medial portions of the stalks are rendered pliant whereby when such medial portions are held suspended the end portions will drop downwardly.

As the stalks leave the centre pair of scraping rollers 89 they are carried between the adjacent ends of the belts 119 and 120, which together provide a conveyor driven to move the medial pliant parts of the stalks towards and across the final series of pairs of longitudinally ribbed scraping rollers medially of the two inclined series of pairs of such scraping rollers. As the medial portions of the stalks are being moved across the machine the ends of the stalks are carried the major part of the distance across the inclined sides of the stand 78 by the conveyors 65 and 66 and the cooperating belt 83 and the ends of the stalks towards the front end of the machine are given added impetus across the stand 78 by a spiked endless conveyor 144 which carries the corresponding ends of the stalks into the tapered mouths of the respective pairs of scraping rollers 105 and 106. These pairs of scraping rollers are so driven as to cause a pull on the stalks towards the front end of the machine while the cooperating inner runs of the belts 119 and 120, which are caused to assume an up-and-down path due to the inner runs thereof being passed alternately under and over the idle rollers 142 and 143, grip the medial portions of the stalks and so cause alternately increasing and decreasing degrees of centrally directed pull on the ends of the stalks so that the portions of the stalks at the ends of the medial pliant portions are reciprocated lengthwise while being scrapped by the rotating rollers.

During the passage of the stalks through the numerous pairs of scraping rollers the spring mountings for the outer ends of the scraping rollers 105 and 106 will yield sufficiently under pressure of material between the rollers to prevent bunching of the material, so that the fibres will readily pass through and be expelled in loose condition.

During the passage of the stalks through the various pairs of scraping rollers gum, bark and other unwanted matter will be completely removed and allowed to drop to the ground while the useful fibres thoroughly cleaned and separated will be expelled at the side of the machine to be picked up by the attendant riding on the platform 129.

What I claim is:

1. In decorticating apparatus for treating fibrous stalks, a table, endless conveyors for conveying stalks laterally across and beyond said table, said conveyors being spaced to engage the stalks at points substantially removed from their ends, three pairs of rollers positioned beyond said table between said conveyors and extending in a direction away from said table, the rollers of each said pairs of rollers being positioned one above the other with the tops of the lowermost rollers being positioned substantially on the same vertical plane as the table so as to receive stalks therebetween from said table, one of the endmost pairs of rollers being driven, the rollers of the centre pair of rollers being unsupported at their ends farthest removed from said table, and means cooperating with the conveyor farthest from said driven pair of rollers whereby to impart lengthwise pull of alternating increasing and decreasing degree on said stalks during their passage through said pairs of rollers.

2. In a decorticating machine including a body having a table extending lengthwise thereof, conveyors operating transversely of said table in spaced relation to each other lengthwise of the table for moving stalks laterally across and beyond said table at one side of the body, means comprising a plurality of pairs of rollers receiving medial portions of said stalks from said conveyors and scraping and rendering relatively pliant medial portions of said stalks in movement beyond said table, a plurality of scraping rollers receiving stalks from said rollers, said scraping rollers arranged in pairs paralleling each other lengthwise of said body and extending at right angles to said table and spaced from said table, said pairs of scraping rollers each comprising inner and outer cooperating members to receive between their ends laterally moving stalks, means receiving the medial scraped portions of said stalks and exerting pull thereon outwardly over said scraping rollers whereby those portions of said stalks beyond said medial scraped portions will be drawn between the inner ends of the respective pairs of scraping rollers, the said scraping rollers receiving the portions of said stalks at opposite sides of said medial scraped portions being driven in opposite directions against the pull on said medial scraped portions, and means for effecting alternately increasing and decreasing centrally directed pull on the portions beyond said medial scraped portions of said stalks at right angles to the longitudinal axes of said scraping rollers.

3. In apparatus for treating fibrous material, a body having a table extending lengthwise thereof for supporting cut stalks in parallel relation lengthwise of said body, conveyors operating transversely of and beyond said table at one side in parallel spaced relation to one another for moving stalks laterally across and beyond said table, a plurality of pairs of scraping rollers extending at right angles to said table between the portions of said conveyors beyond said table and receiving between the ends of the rollers of the respective pairs of rollers medial portions of said stalks, said pairs of scraping rollers being rotatable to cause lengthwise pull on said stalks in one direction, means for effecting an alternately increasing and decreasing pull lengthwise on said stalks in opposition to the pull thereon by said pairs of rollers while said stalks are in progress lengthwise of said pairs of scraping rollers whereby said medial portions of said stalks will be rendered pliant, a plurality of ribbed rollers arranged in pairs paralleling each other lengthwise of the body and extending at right angles to said table in endwise spaced relation to said scraping rollers, said pairs of ribbed rollers each comprising inner and outer cooperating members to receive between their ends laterally moving stalks, means receiving from said pairs of scraping rollers the medial scraped portions of said stalks and drawing same outwardly over said ribbed scraping rollers whereby those portions of said stalks beyond the medial scraped portions will be drawn between the members of the respective pairs of ribbed scraping rollers, said ribbed scraping rollers receiving the portions of said stalks at opposite sides of said medial scraped portions being driven in opposite directions against the pull on said medial scraped portions, and means for effecting alternately increasing and decreasing degrees of centrally directed pull on the portions of said stalks at opposite sides of said medial scraped portions at right angles to the longitudinal axes of said ribbed scraping rollers.

4. In a decorticating machine, a mobile body having a table thereon, for stalks, means to render medial portions of said stalks pliant, a plurality of ribbed scraping rollers arranged in parallel and spaced to provide two endwise related series each comprising a like number of pairs of scraping rollers, each said pair of scraping rollers consisting of an inner roller and an outer roller extending at right angles to said table and adapted to receive between their ends stalks moved laterally from said table, said rollers at their ends at which the stalks are received being tapered to facilitate the entry of the stalks between the rollers of the respective pairs, a pair of endless conveyor belts receiving the medial pliant portions of said stalks between their inner runs and exerting a pull thereon in a direction lengthwise of said rollers and between the two series of rollers, whereby the end portions of said stalks beyond said medial pliant portions will be drawn laterally between the ends of the rollers comprising the respective pairs of ribbed scraping rollers and along the length thereof, means for driving the pairs of rollers of the two series in opposite directions to cause outward endwise pull on the ends of said stalks, and means for causing inwardly directed pull of alternately increasing and decreasing extent on the portions of said stalks beyond said medial pliant portions to impart lengthwise reciprocatory movement to said stalks while they are being moved laterally along said ribbed scraping rollers and being acted on by the rotary action of said rollers, the rollers of each pair of ribbed scraping rollers being spring mounted at their delivery ends so as to be yieldable under pressure of material therebetween.

5. Decorticating apparatus according to claim 4, wherein the inner runs of said endless belts extend alternately over and under successive idle rollers of a series of idle rollers set in staggered relation to one another whereby the medial pliant portions of said stalks confined between said inner runs of said endless belts will be caused to assume an up-and-down path and thereby cause centrally directed endwise pull of alternately increasing and decreasing degree on the ends of said stalks.

6. A decorticating machine, comprising a wheeled body, a table, conveyors for moving stalks laterally beyond said table, a plurality of pairs of rollers extending in parallel at right angles to said table to receive stalks from said table and rendering medial portions of said stalks pliant, a plurality of pairs of scraping rollers paralleling one another lengthwise of said body and spaced from said table, said scraping rollers being arranged in two series spaced longitudinally of said body and arranged at right angles to said table to receive the end portions of said stalks, a stand positioned between said table and the said scraping rollers and receiving the end portions of said stalks and guiding same laterally between the rollers of the respective pairs of scraping rollers, driven conveyor means engaging the medial pliant portions of said stalks and exerting a pull thereon in a direction away from said table whereby the end portions of said stalks will be drawn between the ends of the scraping rollers, the pairs of scraping rollers of the two series being driven in opposite directions to cause endwise pull on stalks in opposite directions, and means for providing alternately increasing and decreasing pull on said end portions of said stalks in opposition to said endwise pull on said stalks.

References Cited in the file of this patent

UNITED STATES PATENTS

| | | |
|---|---|---|
| 905,345 | Mudge | Dec. 1, 1908 |
| 988,151 | Summers | Mar. 28, 1911 |
| 1,255,065 | Teresa | Jan. 29, 1918 |
| 1,317,325 | Shely | Sept. 30, 1919 |
| 1,356,740 | Roberts | Oct. 26, 1920 |
| 1,725,112 | Terao | Aug. 20, 1929 |
| 1,741,602 | Athey | Dec. 31, 1929 |
| 1,808,113 | Howard | June 2, 1931 |
| 1,964,120 | Hollier | June 26, 1934 |
| 2,214,893 | Von Hassel | Sept. 17, 1940 |
| 2,312,779 | Smith | Mar. 2, 1943 |
| 2,423,425 | Lundgren | July 1, 1947 |
| 2,551,128 | Hulfish et al. | May 1, 1951 |
| 2,654,916 | Wright et al. | Oct. 13, 1953 |
| 2,674,010 | Bond et al. | Apr. 6, 1954 |

FOREIGN PATENTS

| | | |
|---|---|---|
| 256,396 | Italy | Dec. 23, 1927 |